(12) United States Patent
Johansson et al.

(10) Patent No.: US 12,445,525 B2
(45) Date of Patent: Oct. 14, 2025

(54) CONNECTING A GROUP OF INDUSTRIAL TOOLS TO A PLURALITY OF CONTROLLERS USING SHARED SINGLE VIRTUAL IP ADDRESS AND IDENTIFIERS

(71) Applicant: ATLAS COPCO INDUSTRIAL TECHNIQUE AB, Stockholm (SE)

(72) Inventors: Erik Olof Johansson, Älta (SE); Robert Mikael Andersson, Solna (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/881,887

(22) PCT Filed: Jun. 2, 2023

(86) PCT No.: PCT/EP2023/064775
§ 371 (c)(1),
(2) Date: Jan. 7, 2025

(87) PCT Pub. No.: WO2024/017532
PCT Pub. Date: Jan. 25, 2024

(65) Prior Publication Data
US 2025/0267194 A1    Aug. 21, 2025

(30) Foreign Application Priority Data
Jul. 18, 2022   (SE) .................... 2230242-6

(51) Int. Cl.
*H04L 67/125*   (2022.01)
*B25B 21/00*   (2006.01)
(Continued)

(52) U.S. Cl.
CPC ............ *H04L 67/125* (2013.01); *B25B 21/00* (2013.01); *H04L 45/74* (2013.01); *H04L 61/5007* (2022.05)

(58) Field of Classification Search
CPC .... H04L 61/5007; H04L 45/74; H04L 67/125
See application file for complete search history.

(56) References Cited

U.S. PATENT DOCUMENTS

| 6,885,667 B1 | 4/2005 | Wilson |
| 7,398,327 B2 | 7/2008 | Lee |

(Continued)

FOREIGN PATENT DOCUMENTS

| CN | 104615102 A | 5/2015 |
| CN | 109634176 A | 4/2019 |

(Continued)

OTHER PUBLICATIONS

Atlas Copco Industrial Technique AB, International Patent Application No. PCT/EP2023/064775, International Search Report, Aug. 3, 2023.

(Continued)

*Primary Examiner* — Hee Soo Kim
(74) *Attorney, Agent, or Firm* — Moore & Van Allen PLLC; W. Kevin Ransom

(57) ABSTRACT

The invention relates to a method of a network device of connecting a group of industrial tools to a plurality of controllers, and a network device performing the method. In an aspect, a method of a network device of connecting a group of industrial tools to a plurality of controllers. The method comprises assigning a single virtual IP address to be shared among the industrial tools in the group, assigning the single virtual IP address to be shared among the plurality of controllers and routing data between the industrial tools and the controllers via the assigned single virtual IP address.

12 Claims, 8 Drawing Sheets

(51) Int. Cl.
*H04L 45/74* (2022.01)
*H04L 61/5007* (2022.01)

(56) References Cited

U.S. PATENT DOCUMENTS

| | | |
|---|---|---|
| 7,881,208 B1 | 2/2011 | Nosella et al. |
| 2004/0008694 A1 | 1/2004 | Guo |
| 2010/0170370 A1* | 7/2010 | Yokoyama .......... B25B 23/1425 81/479 |
| 2013/0274918 A1 | 10/2013 | Zurbau |
| 2018/0253083 A1 | 9/2018 | Ueno |
| 2021/0022194 A1* | 1/2021 | Taylor ..................... H04L 67/34 |
| 2021/0067483 A1 | 3/2021 | Kurokawa |
| 2021/0306297 A1 | 9/2021 | Nakamura et al. |
| 2022/0255770 A1 | 8/2022 | Schoenen et al. |

FOREIGN PATENT DOCUMENTS

| | | |
|---|---|---|
| DE | 102008061721 A1 | 6/2010 |
| EP | 1652354 A1 | 5/2006 |
| EP | 3007471 A1 | 4/2016 |
| EP | 3021301 A1 | 5/2016 |
| WO | 2020173837 A1 | 9/2020 |

OTHER PUBLICATIONS

Atlas Copco Industrial Technique AB, International Patent Application No. PCT/EP2023/064775, Written Opinion, Aug. 3, 2023.
Atlas Copco Industrial Technique AB, International Patent Application No. PCT/EP2023/064775, International Preliminary Report on Patentability, Nov. 28, 2024.
Atlas Copco Industrial Technique AB, Swedish Patent Application No. 2230242-6, Office Action, Jan. 31, 2023.
Atlas Copco Industrial Technique AB, Swedish Patent Application No. 2230242-6, Swedish Search Report, Jan. 31, 2023.
Anonymous, "STwrench—User Guide", Jul. 1, 2014 (Jul. 1, 2014), p. 1-326, chapters 15-18, Retrieved from the Internet: URL:https://servaid.atlascopco.com/AssertWeb/en-US/AtlasCopco/Document/8200070/DownloadConvertedFileAsPdf.

* cited by examiner

CONNECTING A GROUP OF INDUSTRIAL TOOLS TO A PLURALITY OF CONTROLLERS USING SHARED SINGLE VIRTUAL IP ADDRESS AND IDENTIFIERS

CROSS-REFERENCE TO RELATED APPLICATIONS

This application is a National Stage Patent Application (filed under 35 § U.S.C. 371) of PCT/EP2023/064775, filed Jun. 2, 2023 of the same title, which, in turn claims priority to Swedish Patent Application No. 2230242-6 filed Jul. 18, 2022 of the same title: the contents of each of which are hereby incorporated by reference.

TECHNICAL FIELD

The present disclosure relates to a method of a network device of connecting a group of industrial tools to a plurality of controllers, and a network device performing the method.

BACKGROUND

Modern industrial tools are typically in wireless communication with remotely located controllers utilized to control the tools, e.g. for sending operational settings to be applied by the tool or instructions to be displayed to an operator via a display of the tool. In another example, the tool being for instance a tightening tool may communicate measured torque values to the controllers for further evaluation.

In a practical implementation such as at an industrial premise in the form of a factory, a large group of tools may be connected to a great number of controllers. Hence, hundreds of tools may be connected to hundreds of controllers.

Such a practical implementation requires a great amount of network resources to be assigned. In particular, each tool and each controller must be assigned an Internet Protocol (IP) via which the respective tool and controller may be addressed.

SUMMARY

One objective is to solve, or at least mitigate, this problem in the art and thus to provide an improved method of a network device of connecting a group of industrial tools to a plurality of controllers.

This objective is attained in a first aspect by a method of a network device (that is, a method performed by a network device) of connecting a group of industrial tools to a plurality of controllers. The method comprises assigning a single virtual IP address to be shared among the industrial tools in said group, assigning the single virtual IP address to be shared among the plurality of controllers and routing data between the industrial tools and the controllers via the assigned single virtual IP address.

This objective is attained in a second aspect by a network device configured to connect a group of industrial tools to a plurality of controllers, the network device comprising a processing unit and a memory, said memory containing instructions executable by said processing unit, whereby the network device is operative to assign a single virtual IP address to be shared among the industrial tools in said group, assign the single virtual IP address to be shared among the plurality of controllers, and to route data between the industrial tools and the controllers via the assigned single virtual IP address.

Advantageously, rather than having to assign tens or hundreds of static IP addresses to the tools and the controllers i.e. one specific IP address for each tool and one specific IP address for each controller, a single virtual IP address is assigned for connecting a particular tool to a particular controller which saves network resources in the form IP addresses.

In an embodiment, the method comprises assigning to each industrial tool in the group a unique identifier being utilized to address an individual industrial tool in the group via the assigned single virtual IP address.

In an embodiment, the method comprises assigning to each controller a unique identifier being utilized to address an individual controller among the plurality of controllers via the assigned single virtual IP address.

In an embodiment, the identifier is included in a data packet to be communicated to a selected individual industrial tool or selected individual controller via the assigned single virtual IP address.

In an embodiment, the method comprises performing data packet inspection to extract an identifier and determining, based on the extracted identifier, to which individual industrial tool (or controller the data packet is to be routed via the assigned single virtual IP address.

In an embodiment, the identifier is a serial number of the individual industrial tool or controller.

In an embodiment, the method comprises storing operational data of each industrial tool.

In an embodiment, the industrial tools are tightening tools.

In a third aspect, a computer program is provided comprising computer-executable instructions for causing the network device to perform steps recited in the method of the first aspect when the computer-executable instructions are executed on a processing unit included in the network device.

In a fourth aspect, a computer program product is provided comprising a computer readable medium, the computer readable medium having the computer program according to the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
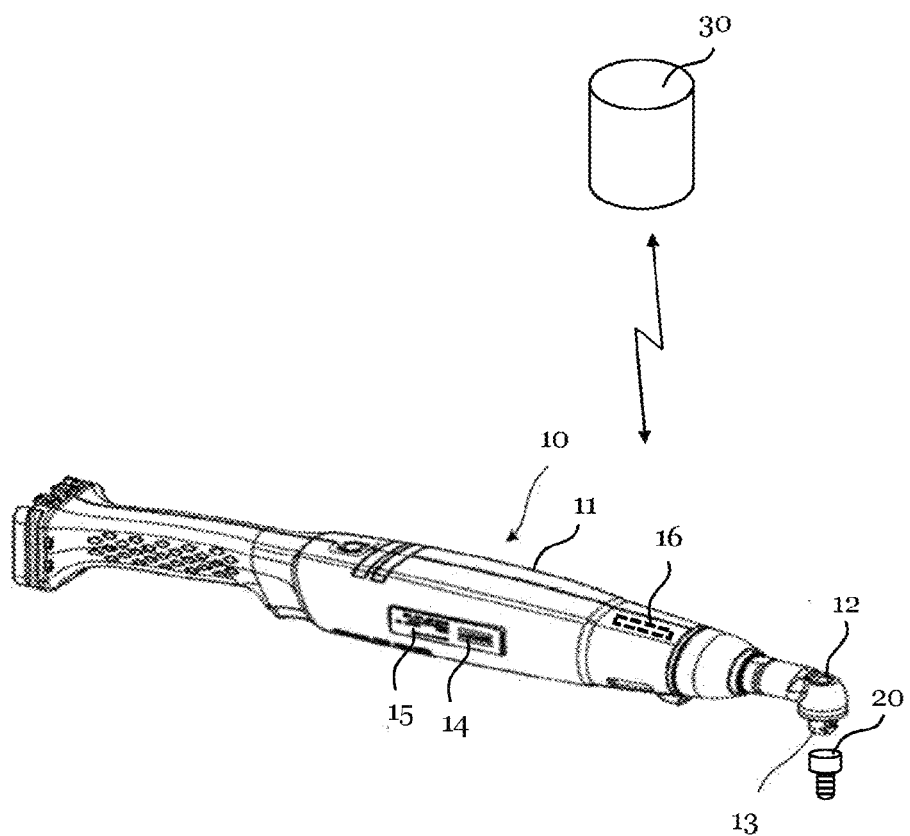
FIG. 1 illustrates an industrial tool for which tool embodiments may be implemented.

FIG. 1 illustrates an industrial tool in the form of a tightening tool 10 configured to apply a torque to a fastener such as a bolt 20, for which tool embodiments may be implemented.

The tightening tool 10 may be cordless or electrically powered via a cord and has a main body 11 and a tool head 12. The tool head 12 has an output shaft 13 with a socket (not shown) configured to be rotatably driven by an electric motor arranged inside the main body 11 to apply the torque to the bolt 20.

The tightening tool 10 may be arranged with a display 14 via which an operator of the tool 10 may be presented with information relating to operation of the tool 10, and an interface 15 via which the operator may input data to the tool 10.

The tightening tool 10 may further be arranged with communicating capability in the form of a radio transmitter/receiver 16 for wirelessly transmitting operational data, such as applied torque, to a remotely located controller such as a cloud server 30. Alternatively, communication between the tool 10 and the controller 30 may be undertaken via a wired connection.

Thus, the tool 10 may for instance communicate measured torque values to the controller 30 for further evaluation while the controller 30 e.g. may send operational settings to be applied by the tool 10 or instructions to be displayed to the operator via the display 14.

Figure 2:
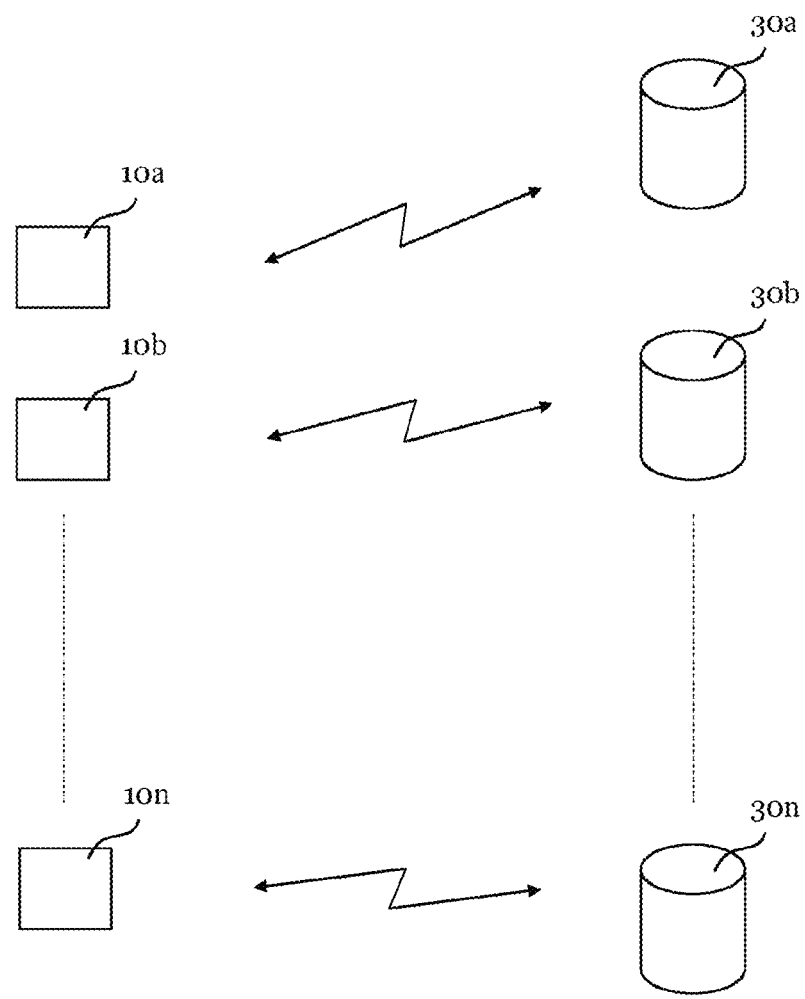
FIG. 2 illustrates a prior art communication scenario.

Now with reference to FIG. 2, in a practical implementation such as at an industrial premise in the form of a factory, a large group of tools 10a, 10b, . . . , 10n may be connected to a great number of controllers 30a, 30b, . . . 30n. Hence, hundreds of tools may be connected to hundreds of controllers.

Such a practical implementation requires a great amount of network resources to be assigned. In particular, each tool and each controller must be assigned an Internet Protocol (IP) via which the respective tool and controller may be addressed.

Figure 3:
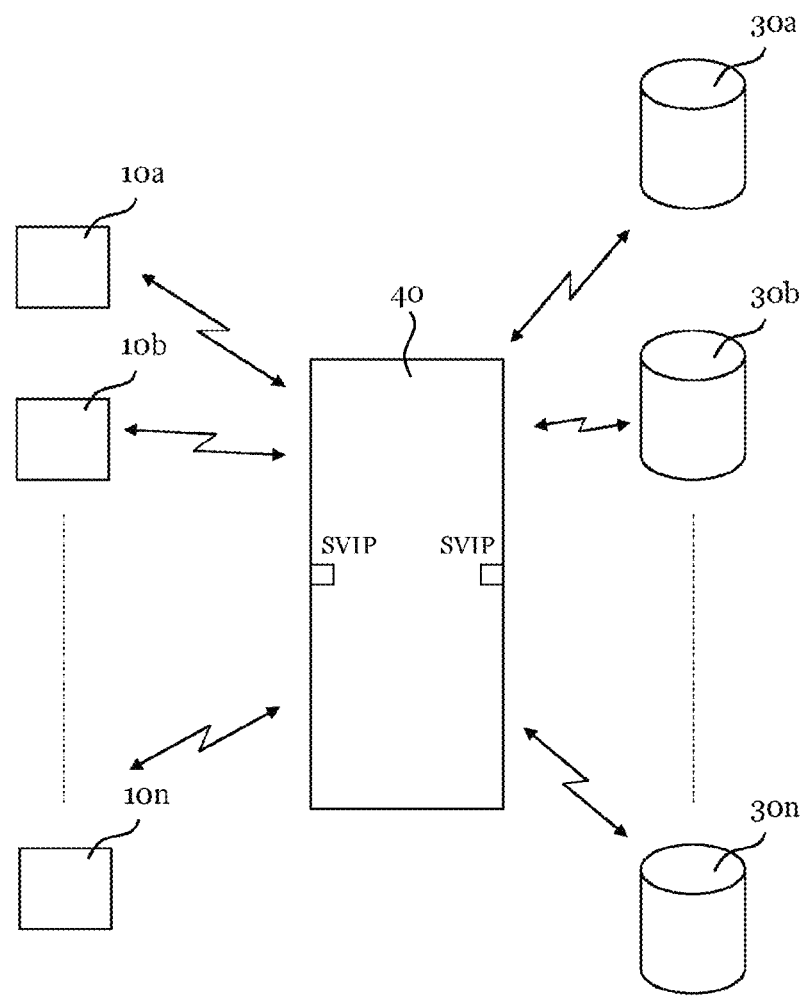
FIG. 3 illustrates a network device according to an embodiment.

To resolve this issue, a network device 40 is proposed being configured to connect the tools 10a-n to the controllers 30a-n as illustrated in FIG. 3. Thus, the network device 40 acts as an intermediary device for connecting the tools 10a-n to the controllers 30a-n.

Figure 4:
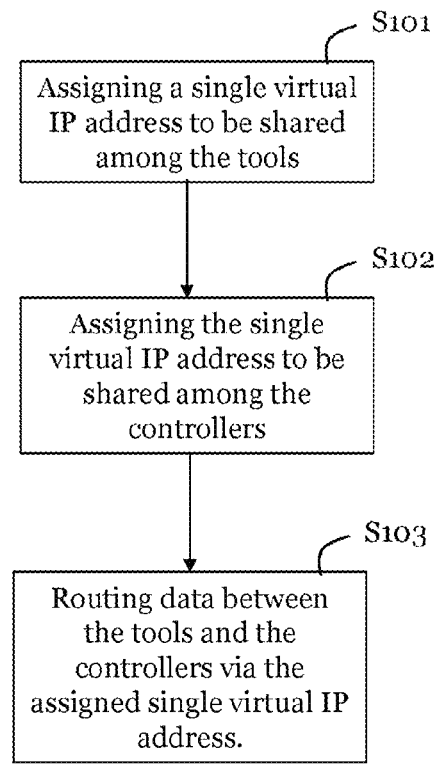
FIG. 4 shows a flowchart illustrating a method according to an embodiment.

Reference is further made to FIG. 4 showing a flowchart illustrating a method of the network device 40 of connecting the group of industrial tools 10a-10n to the plurality of controllers 30a-30n.

Hence, in step S101, the network device 40 assigns to the group of tools 10a-b a single virtual IP address (SVIP) to be shared among the tools 10a-10.

Further, the network device 49 assigns in step S102 the single virtual IP address to the controllers, 30a-n, also for sharing among the controllers.

Thereafter, in step S103, any data transmitted between the industrial tools 10a-c and the controllers 30a-c (in any direction) is routed via the single virtual IP address assigned by the network device 40.

Advantageously, rather than having to assign tens or hundreds of static IP addresses to the tools 10a-n and the controllers 30a-n, i.e. one specific IP address for each tool and one specific IP address for each controller, a single virtual IP address is assigned for connecting a particular tool to a particular controller which saves network resources in the form IP addresses.

Figure 5:
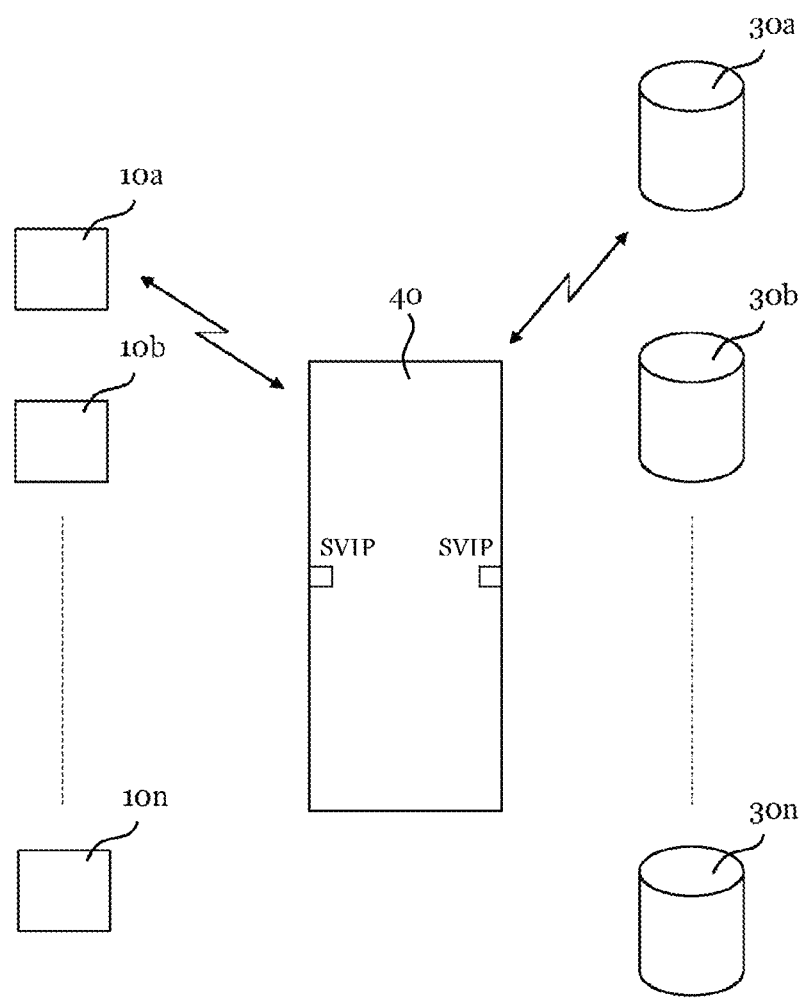
FIG. 5 illustrates a network device routing data from a control to a tool according to an embodiment.
Figure 6:
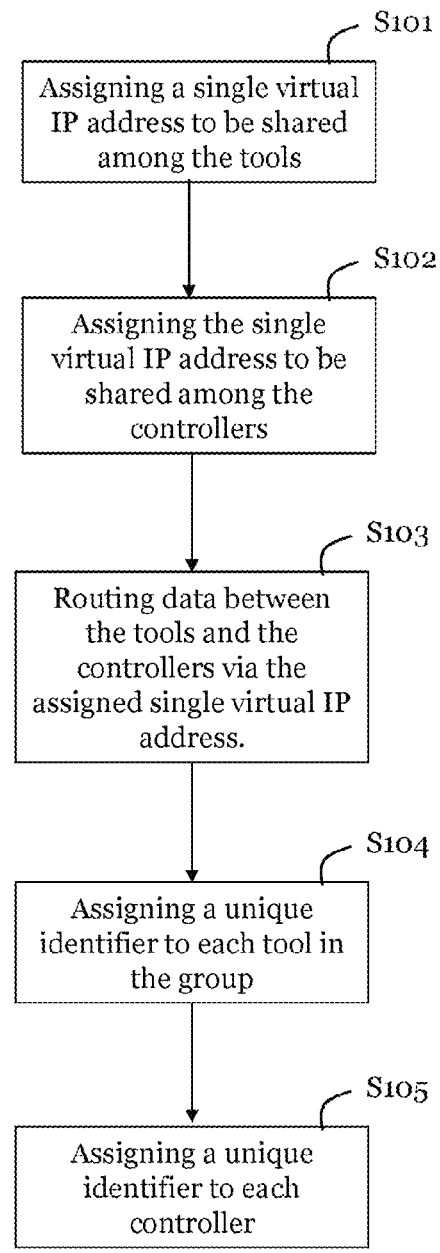
FIG. 6 shows a flowchart illustrating a method according to another embodiment.

FIGS. 5 and 6 illustrate a further embodiment. Since the tools 10a-10n and the controllers 30a-n share the single virtual IP address having been assigned, data to be transmitted from a controller to a tool (and vice) versa must somehow be addressed to the individual tool for which the data is intended.

Thus, the network device 40 assigns in step S104 to each industrial tool 10a-n in the group a unique identifier being utilized to address an individual industrial tool in the group via the assigned single virtual IP address.

Similarly, for communication to be enabled in the direction from the tools 10a-n to the controllers 30a-n, the network device 40 assigns in step S105 to each controller 30a-n a unique identifier being utilized to address an individual controller via the assigned single virtual IP address.

Assuming for instance that first controller 30a wishes to send control data to first tool 10a, the first controller will address the first tool using the unique identifier having been assigned to the first tool 10a.

When the network device 40 receives the data from the first controller 30a via the assigned single virtual IP address, the network device 40 will determine from the identifier stated by the first controller 30a to which tool the data is intended, i.e. the first tool 10a, and consequently forward the data to the first tool 10a via the assigned single virtual first IP address In an example, the network device 40 will setup a mapping table where each unique identifier is mapped to a physical tool/controller.

An example of tool-identifier mapping is shown below. As is understood, a similar mapping is made for the controllers.

10001 á First tool 10a

10002 á Second tool 10b, and so on.

In an embodiment, the identifier being utilized is the serial number of the tool (and similarly for the controllers). In the above example, the serial number of the first tool 10a is "10001" while the serial number of the second tool 10b is "10002".

Assuming that the first controller 30a is to establish a connection to a tool (or vice versa), e.g. the first tool 10a, it transmits a data packet to the assigned single virtual IP address. The data packet could have the appearance of:

10001 Payload data

In other words, the data packet transmitted will comprise the identifier of the first tool 10a, in this example the serial number of the tool, followed by any payload data to be delivered to the tool, for instance an operational setting to be changed at the tool 10a regarding e.g. torque to be applied.

In case the transmission is performed in the other direction, i.e. from the first tool 10a to the first controller 30a. the payload data may include dynamic and static information describing the tool.

Figure 7:
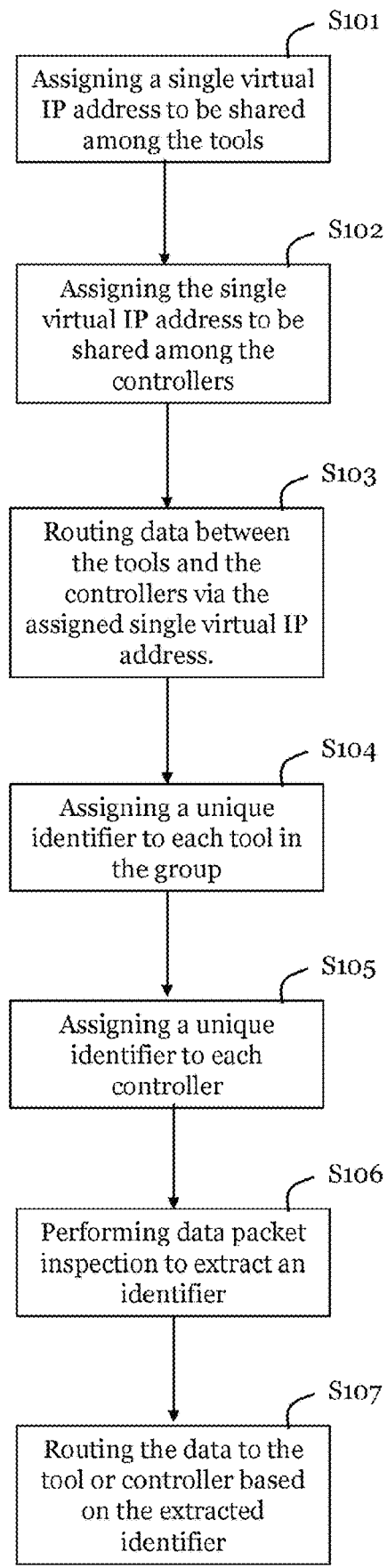
FIG. 7 shows a flowchart illustrating a method according to a further embodiment.
Figure 8:
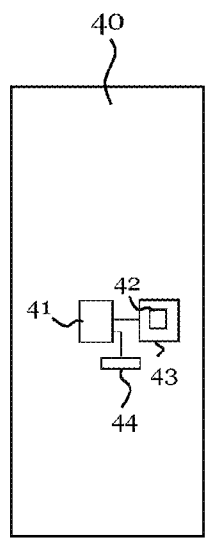
FIG. 8 illustrates a network device according to an embodiment.

With reference to FIG. 7, the network device 40 will thus from packet inspection conclude in step 106 that the data packet should be delivered in step S107 via the assigned single virtual IP address to the first tool 10a rather than any other of the group of tools to which the single virtual IP address also is assigned. If the transmission is performed in the other direction, data is delivered to an intended controller in the group of controllers. The network device 40 will thus route the data to the correct tool or controller based on the extracted identifier and a mapping from tool identifier to controller identifier.

The network device 40 will establish a connection with tool 10a, and also a connection with controller 30a, forwarding the payload data from tool 10a or the controller 30a depending on the direction of transmission. Further communication back-and-forth between tool and controller will be routed through the network device 40 on the established connections using the single virtual IP address.

The network device 40 may for instance use a look-up table stored locally to determine to which individual tool (or controller) the data packet is to be delivered by associating the respective tool (or controller) with an identifier in the look-up table.

A further advantage of using the single virtual IP address is that no reconfiguration is required should one or more of the tools or controllers move; the single virtual IP address and identifier may still be used.

Moreover, if e.g. a controller would be disconnected or if a failure would occur at a controller, the tool(s) served by that controller may be swiftly redirected to another controller.

Further advantageous is that all tools can have the same network configuration, regardless of which controller application the tool is assigned to.

In yet an embodiment, the network device 40 hosts a database serving as an inventory of all connected tools, containing data and metrics for each individual tool.

The steps of the method to be described in the following as performed by the network device 40 are in practice performed by a processing unit 41 embodied in the form of one or more microprocessors arranged to execute a computer program 42 downloaded to a storage medium 43 associated with the microprocessor, such as a Random Access Memory (RAM), a Flash memory or a hard disk drive. The processing unit 41 is arranged to cause the network device 41 to carry out the method according to embodiments when the appropriate computer program 42 comprising computer-executable instructions is downloaded to the storage medium 43 and executed by the processing unit 41. The storage medium 43 may also be a computer program product comprising the computer program 42. Alternatively, the computer program 42 may be transferred to the storage medium 43 by means of a suitable computer program product, such as a Digital Versatile Disc (DVD) or a memory stick. As a further alternative, the computer program 42 may be downloaded to the storage medium 43 over a network. The processing unit 41 may alternatively be embodied in the form of a digital signal processor (DSP), an application specific integrated circuit (ASIC), a field-programmable gate array (FPGA), a complex programmable logic device (CPLD), etc. The network device 40 further comprises an interface via which the processing unit 41 wirelessly receives and transmits data.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a network device of connecting a group of industrial tools to a plurality of controllers, comprising:
   assigning a single virtual IP address to be shared among the industrial tools in said group of industrial tools;
   assigning the single virtual IP address to be shared among the plurality of controllers;
   routing, through the network device, data between the industrial tools and the controllers via the assigned single virtual IP address;
   assigning to each industrial tool in the group of industrial tools a unique identifier being utilized to address an individual industrial tool in the group via the assigned single virtual IP address;
   assigning to each controller a unique identifier being utilized to address an individual controller among the plurality of controllers via the assigned single virtual IP address, the unique identifier being included in a data packet to be communicated to a selected individual industrial tool or selected individual controller via the assigned single virtual IP address;
   performing data packet inspection to extract the unique identifier; and
   determining, based on the extracted unique identifier, to which individual industrial tool or controller the data packet is to be routed through the network device via the assigned single virtual IP address.

2. The method of claim 1, the identifier being a serial number of the individual industrial tool or controller.

3. The method of claim 1, further comprising:
   storing operational data of each industrial tool.

4. The method of claim 1, wherein the industrial tools are tightening tools.

5. A computer program product stored on a non-transitory computer readable medium, said computer program product for use in a network device for connecting a group of industrial tools to a plurality of controllers, wherein said computer program product comprising computer instructions to cause one or more processing devices to perform the following operations: assigning a single virtual IP address to be shared among the industrial tools in said group of industrial tools; assigning the single virtual IP address to be shared among the plurality of controllers; routing, through the network device, data between the industrial tools and the controllers via the assigned single virtual IP address; assigning to each industrial tool in the group of industrial tools a unique identifier being utilized to address an individual industrial tool in the group of industrial tools via the assigned single virtual IP address; assigning to each controller a unique identifier being utilized to address an individual controller among the plurality of controllers via the assigned single virtual IP address, the unique identifier being included in a data packet to be communicated to a selected individual industrial tool or selected individual controller via the assigned single virtual IP address; performing data packet inspection to extract the unique identifier; and determining, based on the extracted unique identifier, to which individual industrial tool or controller the data packet is to be routed through the network device via the assigned single virtual IP address.

6. The computer program product of claim 5, the identifier being a serial number of the individual industrial tool or controller.

7. The computer program product of claim 5, wherein said computer program product further comprising computer instructions to cause one or more processing devices to perform the following operation:

storing operational data of each industrial tool.

8. The computer program product of claim 5, wherein the industrial tools are tightening tools.

9. A network device configured to connect a group of industrial tools to a plurality of controllers, the network device comprising a processing unit and a memory, said memory containing instructions executable by said processing unit, whereby the network device is operative to:

assign a single virtual IP address to be shared among the industrial tools in said group of industrial tools;

assign the single virtual IP address to be shared among the plurality of controllers;

route data between the industrial tools and the controllers through the network device via the assigned single virtual IP address;

assign to each industrial tool in the group of industrial tools a unique identifier being utilized to address an individual industrial tool in the group via the assigned single virtual IP address;

assign to each controller a unique identifier being utilized to address an individual controller among the plurality of controllers via the assigned single virtual IP address, the unique identifier being included in a data packet to be communicated to a selected individual industrial tool or selected individual controller via the assigned single virtual IP address;

perform data packet inspection to extract the unique identifier; and determine, based on the extracted unique identifier, to which individual industrial tool or controller the data packet is to be routed through the network device via the assigned single virtual IP address.

10. The network device of claim 9, the identifier being a serial number of the individual industrial tool or controller.

11. The network device of claim 9, further comprising:

storing operational data of each industrial tool.

12. The network device of claim 9, wherein the industrial tools are tightening tools.

* * * * *